Patented Dec. 5, 1950

2,533,166

UNITED STATES PATENT OFFICE 2,533,166

PROCESS FOR POLYMERIZING WATER-SOLUBLE POLYACRYLAMIDES AND POLY-ALPHA-SUBSTITUTED ACRYLAMIDES

Giffin D. Jones, Easton, Pa., assignor to General Aniline & Film Corporation, New York, N. Y., a corporation of Delaware No Drawing. Application October 16, 1945, Serial No. 622,704

8 Claims. (Cl. 260—89.7)

The present invention relates to the production of polymers of acrylamides. More particularly, the invention relates to the production of water-soluble polymers of acrylamides, which have good protective colloid action. Another primary feature of this invention involves polymers of acrylamides which are water-soluble, have a good protective colloid action, a Zsigmondy gold number less than $10^{-3}$, and are compatible with gelatin. By the term "acrylamides," I include both the α-unsubstituted and the α-substituted acrylic acid amides, such as, for example, α-aliphatic, cycloaliphatic, aryl, aralkyl and α-halogen substituted acryl amides; for instance, methyl, propyl, butyl, isopropyl, amyl, phenyl, methylphenyl, cyclohexyl, methylcyclohexyl, benzyl, and chloro and bromo α-substituted acryl amides.

It is among the objects of this invention to produce polyacrylamides which are readily soluble in water, and which, in particular, have a good protective colloid action for silver halides, are compatible with gelatin silver halide photographic emulsions, and may be used as a gelatin substitute in such emulsions.

It is a further object of this invention to produce polyacrylamides having a high peptizing action and which will prevent the sedimentation of finely divided materials such as pigments and silver halide dispersed in aqueous media.

The polymerization of acrylamides and derivatives thereof in bulk or in water generally leads to the formation of water-insoluble polymers.

According to the present invention, it has been found that by carrying out the polymerization of acrylamides in solutions of organic solvents, the molecular weight of the polymer can be confined to a range whereby the polymer obtained is water-soluble, possesses a low gold number and a high protective colloid action. In general, my invention comprises carrying out the polymerization of acrylamides in the presence of solvents and while subjecting the monomers to ultraviolet light or catalysts such as, peroxide catalysts. However, it is preferred to carry out the process with ultraviolet light in the absence of oxygen, it being desired not to introduce peroxides detrimental to use of the polymer in photographic emulsions. Polymers prepared with peroxides may result in fogging the emulsion containing such polymers.

It has already been proposed, as see U. S. Patent 2,311,548, granted to Jacobson et al., to produce a water-soluble polymer of N-methylmethacrylamide by polymerizing the monomer in hot toluene in the presence of benzoyl peroxide under heat at reflux conditions for several hours. While soluble in water, the polymer which is obtained is too low in molecular weight to give protective colloid action on silver halides. Thus, the polymer produced by this method has a gold number which is greater than 0.1 which rating for any substance is regarded as exhibiting negligible protective action. On the other hand, the water-soluble polymers produced by my process have a Zsigmondy gold number, in general, less than $10^{-3}$ and in most cases less than $10^{-4}$. The gold number is superior to that of gelatin which is $6 \times 10^{-3}$.

Various solvents may be utilized in my process for producing water-soluble polymers but in particular non-hydrocarbon solvents are effective. As examples of suitable solvents, there may be mentioned aliphatic halogen compounds, such as, for example, chloroform; dioxane; aliphatic alcohols, such as methyl, ethyl, propyl, isopropyl alcohols; and dimethylformamide. However, the aliphatic alcohols are preferred as solvents. Another highly satisfactory solvent is dimethylformamide. The solvents employed are such as confine the molecular weight of the polymer formed within a range where the polymer is water-soluble, possesses a low gold number, preferably less than $10^{-3}$ and is compatible with gelatin.

In the case of a monomer which possesses an alcohol group in its molecule, no additional solvent is required to obtain a water-soluble polymer, provided that the polymerization is interrupted before complete conversion. Thus, for example, N-alkylol acrylamides, both α-substituted and α-unsubstituted, and having one hydrogen atom in the nitrogen atom, as for instance, N-ethanolacrylamide and N-ethanolmethacrylamide may be polymerized to water-soluble polymers when polymerization is interrupted at about 10–50% conversion. However, it is highly advantageous to have present added solvent since the conversion can be carried further while at the same time obtaining a water-soluble polymer thereby eliminating the careful control required for interrupting polymerization in order to obtain maximum yield of water-soluble polymer.

It is preferred to carry out the polymerization in the absence of any oxygen-yielding catalyst and at room temperatures or below.

The following examples, in which the parts are by weight, are given by way of illustration.

*Example 1*

To a solution of 25 g. (0.35 mol) of acrylamide in 100 cc. of alcohol was added 0.1 g. of benzoyl peroxide. The solution was placed under a Hanovia ultraviolet light. Precipitation of polymer began in 26 hours and was complete after 4 days, no acrylamide being recoverable. On filtration, the alcoholic filtrate was found to be neutral. The white solid polymer was filtered, dried and powdered. It was completely water-soluble. A 1% solution in water had a relative viscosity of 1.8. The K value of the polymer was 53.9 and softening point (Dennis) 188° C.

Analysis: Calculated for $(C_3H_5NO)_n$: N, 19.7. Found: N, 19.3.

Example 2

Two and one-half parts of acrylamide were dissolved in (A) 5 parts of water
(B) 4 parts of methanol
(C) 4 parts of methanol in evacuated glass tubes which were sealed. The contents of tubes A and B were subjected to ultraviolet light for 24 hours at 40° C. and that of tube B at −30° C. for 24 hours. At the end of this time, there had formed in tube A a clear gel. The polymer swelled but did not dissolve. A polymer, however, had precipitated in tubes B and C which dissolved in water, polymer B dissolving more slowly than polymer C.

Example 3

In 1.6 parts of ethanol was dissolved 0.5 part of acrylamide and the solution subjected to ultraviolet light at 40° C. for about 12 hours. The same procedure was repeated with 200 parts of acrylamide and 640 parts of ethanol. In each case, a white polymer was obtained which was soluble in water and completely compatible with gelatin. The gold number of the polymer was less than $2.5 \times 10^{-4}$.

One volume of a 10% aqueous solution of the polymer prepared as above was mixed with 9 volumes of an 11% aqueous bone gelatin solution. A clear solution was obtained which when cast gave a perfectly clear film.

Example 4

A solution of 1 part of methacrylamide dissolved in 8 parts of methanol was sealed in an evacuated tube and polymerized with ultraviolet light at −35° C. The polymer readily dissolved in hot water.

Example 5

Methacrylamide (2 parts) was polymerized in isopropyl alcohol (8 parts) under ultraviolet light at 40° C. for 12 hours. A polymer formed which readily dissolved in water and had a gold number of less than $10^{-3}$.

Example 6

Methacrylamide (2 parts) was polymerized in dioxane (10 parts) under ultraviolet light at 40° C. for 12 hours. A polymer formed which readily dissolved in water and had a gold number of less than $10^{-3}$.

Example 7

Equal volumes of N-methylmethacrylamide and methanol were sealed in vacuo in a glass tube and subjected to ultraviolet light while cooled to −25° C. After 25 hours, the tube contained a rubbery gel which was dissolved in water and precipitated with acetone. The precipitate readily dissolved in water and when mixed with gelatin was found to be substantially compatible therewith.

Example 8

Five volumes of N-β-ethanolmethacrylamide were sealed in a tube which contained 5 volumes of methanol. The tube was placed under ultraviolet light at room temperature. After a week the contents of the tube were honey-like. The tube was opened and when the solution was poured into water it dissolved rapidly. The water solution was precipitated in acetone, yielding 2.5 parts of a white powder which was very water-soluble. The gold number of the polymer was less than $10^{-4}$.

Aanalysis: Calculated for $(C_6H_{11}O_2)_n$: N, 10.84. Found, N, 10.91.

One volume of a 10% aqueous solution of the above obtained polymer of N-β-ethanolmethacrylamide was mixed with 9 volumes of an 11% aqueous bone gelatin solution. A clear solution was obtained which when cast gave a perfectly clear film.

Example 9

2.5 parts of N-β-ethanolmethacrylamide were polymerized as in Example 8 in a sealed tube without the use of any solvent. The tube was opened and the polymer had formed a white solid that was found to be soft due to incomplete conversion of the monomer to polymer. The product dissolved on warming in 10 parts of water and was precipitated in acetone, yielding 0.8 part of a very water-soluble polymer. A 20% solution was readily formed by dissolving 0.7 part in 3.5 parts of water. The gold number of the polymer was less than $10^{-4}$.

Analysis: Calculated for $(C_6H_{11}O_2N)_x$: N, 10.84. Found: N, 10.64.

Example 10

Equal volumes of N-β-ethanolmethacrylamide and dimethyl formamide were placed in a tube which was sealed under vacuum, and irradiated with ultraviolet light at 30° C. After 9 days, the solution was diluted with acetone and the polymer recovered by filtration. It was soluble in water and had a gold number of less than $2.5 \times 10^{-4}$.

Example 11

Equal volumes of N-ethanolacrylamide and methanol were placed in a glass tube and subjected to ultraviolet light at 40° C. The polymerization was interrupted at 30% yield of polymer. The polymer was highly soluble in water and had a gold number of less than $2.5 \times 10^{-4}$.

The N-β-ethanolmethacrylamide employed in the above examples is preferably prepared according to the method described in my copending application Serial No. 622,702, filed October 16, 1945. For example, the monomer, may be prepared by reacting one mol of methacrylylchloride with 2 mols of ethanolamine in the presence of acetonitrile, filtering the N-β-ethanolmethacrylamide from the ethanolamine hydrochloride which precipitates, and distilling the filtrate to recover pure monomer.

The polymerization temperatures employed in my process may be varied within wide limits. Room temperatures or temperatures above or below room temperatures may be employed depending on the monomer and solvent utilized. Thus the preferred temperature range need not exceed about 40° C. although higher temperatures may be used. In general, lower temperatures result in a polymer having higher molecular weights as does increasing the concentration of the monomer in the solvent. Polymers prepared in the absence of catalysts, as for example, peroxides, are highly advantageous for use in gelatin photographic emulsions since they are photographically inert and do not cause fogging. The polymers, however, may be utilized for other purposes such as for temporary sizing and finishing.

The method for determining the "gold number" of the various water-soluble polymers is that described by Zsigmondy and Joel (Z. Phys. Chem., vol. 113, 299, 1944).

This test utilizes the fact that the change of colloidal gold from red to blue as effected by the addition of sodium chloride is prevented by small amounts of protective colloids, as for example, gelatin. The gold number is defined as the minimal amount in milligrams per cubic centimeter of protective colloid required for preventing this change. A colloid having a low gold number, in general, exhibits a high protective colloid action. The test for determining the gold number of the various water-soluble polymers obtained according to the herein-described invention was carried out in the following manner. To 1 cubic centimeter of individual samples varying in concentration from 0.1 gram per cc. to $2.5 \times 10^{-4}$ milligrams per cc. of the individual polymers is added 5 cc. of red colloidal gold solution and 0.5 cc. of 10% sodium chloride solution.

In the absence of the protective colloid, the addition of sodium chloride changes the red solution to blue as viewed by reflected light. The number of milligrams of the sample that is just insufficient to prevent the change from red to blue is known as the "gold number."

The red-gold solution was prepared according to the directions of Pollack (Am. J. Chem. Path. Tech. Sec., vol. 8, page 8, 1944), (C. A., vol. 38, page 2356). For the determination of the necessary amount of potassium carbonate solution, there were added 4 drops of 1% alcoholic phenolphthalein to a solution of 0.5 cc. of 1% aqueous auric chloride in 50 cc. of water. This was titrated with 5% potassium carbonate to a permanent red color, 0.2 cc. being required.

For the determination of the optimum temperature, 50 cc. of water were heated to 60° C. and there was added 0.5 cc. of a 1% aqueous solution of auric chloride and 0.2 cc. of potassium chloride. The solution was heated to 80° C. and 2.5 cc. of a 5% glucose solution was added. Heating was continued to 85–86° C. at which temperature the color changed to red.

The red-gold solution was then prepared by heating in a 1 liter Florence flask 500 cc. of water to 60° C., adding 5 cc. of 1% auric chloride and 4 cc. of potassium carbonate. The solution was heated to 85–86° C. and 12.5 cc. of 5% glucose solution were added. The flask was removed from the flame and rotated until the color changed from colorless to red. The solution was cooled and stored in a dark bottle.

According to the test above described, the gold number for gelatin was 0.006. On the other hand, the gold number for the various water-soluble polymers coming within the scope of the instant invention is less than $10^{-3}$. Thus, they are far superior in their protective colloid action to that of gelatin.

The water-soluble polymers herein described are also found to be superior in preventing sedimentation of finely divided materials such as silver halides, such as are used for photographic emulsions in dispersed phase. This was determined by carrying out silver bromide peptization tests. According to these tests, equivalent amounts of silver nitrate and ammonium bromide were mixed and shaken with .5% aqueous solutions of the various polymers. After standing for 12 hours, the degree of settling of silver bromide was noted.

A more detailed description of the silver bromide peptization tests is the following: To 1 cc. of 0.102 N ammonium bromide solution were added 2 cc. of the solution to be examined for protective colloid action and then 1 cc. of 0.09914 N silver nitrate. The mixture was shaken and after standing for 12 hours in the dark was examined for settling. The ammonium bromide and silver nitrate were gravimetrically equivalent. In a comparison with (1) the polymer produced by polymerizing N-methyl methacrylamide according to Example 7 with (2) the polymer of N-methyl methacrylamide polymerized with benzoyl peroxide in hot toluene according to Example II of Patent 2,311,548, there was no settling of silver bromide with (1), while sedimentation of silver bromide occurred with (2). Similar superior results were obtained in tests carried out with other polymers.

The above detailed description and examples are intended to be merely illustrative of the invention. Variations and modifications which come within the spirit of the invention are also intended to be included within the scope of the claims.

I claim:

1. A process for preparing water-soluble gelatin-compatible polymers having a gold number of less than $10^{-3}$, which consists in catalytically polymerizing, at a temperature not substantially exceeding 40° C., an amide of the class consisting of the amides of acrylic, α-alkyl-, α-aryl-, α-aralkyl-, and α-halo-substituted acrylic acids, and the N-monomethyl and N-mono-(β-ethanol) derivatives of said amides, in the liquid phase, while dissolved in a solvent of the class consisting of alcohols of 1 to 3 carbon atoms, dioxane, dimethyl-formamide and chloroform; and recovering the polymer from the reaction mixture.

2. A process as defined in claim 1, wherein the polymerization is effected by irradiation with ultraviolet light.

3. A process as defined in claim 1, wherein the solvent is an aliphatic alcohol of 1 to 3 carbon atoms.

4. A process for preparing a water-soluble gelatin-compatible polymer which consists in polymerizing methacrylamide by irradiation with ultraviolet light at a temperature not substantially exceeding 40° C., in the liquid phase, while dissolved in a solvent of the class consisting of alcohols of 1 to 3 carbon atoms, dioxane, dimethyl-formamide and chloroform; and recovering the polymer from the reaction mixture.

5. A process for preparing a water-soluble gelatin-compatible polymer which consists in polymerizing acrylamide by irradiation with ultraviolet light at a temperature not substantially exceeding 40° C., in the liquid phase, while dissolved in a solvent of the class consisting of alcohols of 1 to 3 carbon atoms, dioxane, dimethyl-formamide and chloroform; and recovering the polymer from the reaction mixture.

6. A process for preparing a water-soluble gelatin-compatible polymer which consists in polymerizing N-(β-ethanol)-methacrylamide by irradiation with ultraviolet light at a temperature not substantially exceeding 40° C., in the liquid phase, while dissolved in a solvent of the class consisting of alcohols of 1 to 3 carbon atoms, dioxane, dimethyl-formamide and chloroform; and recovering the polymer from the reaction mixture.

7. A process for preparing a water-soluble gelatin-compatible polymer which consists in polymerizing N-(β-ethanol)-acrylamide by irradiation with ultraviolet light at a temperature not substantially exceeding 40° C., in the liquid phase, while dissolved in a solvent of the class consisting of alcohols of 1 to 3 carbon atoms, dioxane, dimethyl-formamide and chloroform; and recovering the polymer from the reaction mixture.

8. A process for preparing a water-soluble gelatin-compatible polymer which consists in polymerizing N - methyl - methacrylamide by irradiation with ultraviolet light at a temperature not substantially exceeding 40° C., in the liquid phase, while dissolved in a solvent of the class consisting of alcohols of 1 to 3 carbon atoms, dioxane, dimethyl-formamide and chloroform; and recovering the polymer from the reaction mixture.

GIFFIN D. JONES.

REFERENCES CITED

The following references are of record in the file of this patent:

UNITED STATES PATENTS

| Number | Name | Date |
| --- | --- | --- |
| 2,006,002 | Schneider | June 25, 1935 |
| 2,090,596 | Jacobson | Aug. 17, 1937 |
| 2,171,765 | Rohm et al. | Sept. 5, 1939 |
| 2,289,540 | Dittman et al. | July 14, 1942 |
| 2,311,548 | Jacobson et al. | Feb. 16, 1943 |
| 2,409,126 | Kenyon et al. | Oct. 8, 1946 |

FOREIGN PATENTS

| Number | Country | Date |
| --- | --- | --- |
| 229,430 | Switzerland | Jan. 17, 1944 |
| 467,402 | Great Britain | June 11, 1937 |
| 815,908 | France | July 26, 1937 |